United States Patent [19]

Pele et al.

[11] Patent Number: 4,989,087
[45] Date of Patent: Jan. 29, 1991

[54] MULTI-PREDICTIVE METHOD TO ESTIMATE THE MOTION OF THE POINTS OF AN ELECTRONIC PICTURE

[75] Inventors: Daniele Pele; Bruno Choquet, both of Rennes, France

[73] Assignees: Etat Francais (CNET), Issy Les Moulineaux; Telediffusion De France, Montrouge Cedex, both of France

[21] Appl. No.: 284,390

[22] Filed: Dec. 14, 1988

[30] Foreign Application Priority Data

Dec. 16, 1987 [FR] France ................................ 87 17601

[51] Int. Cl.$^5$ ........................ G06F 15/70; H04N 7/137
[52] U.S. Cl. ..................................... 358/136; 358/135; 358/133; 358/105
[58] Field of Search ............... 358/133, 135, 136, 138, 358/105

[56] References Cited

U.S. PATENT DOCUMENTS

| 4,695,882 | 9/1987 | Wada | 358/136 |
| 4,703,350 | 10/1987 | Hinman | 358/133 |
| 4,703,351 | 10/1987 | Kondo | 358/135 |

Primary Examiner—Howard W. Britton
Attorney, Agent, or Firm—R. Lewis Gable

[57] ABSTRACT

A method for the estimation of the motion of electronic picture points, in the plane of the picture, by means of fast, convergent and adaptive processing, notably in order to enable subsequent, efficient processing, by sub-sampling, of the picture sequence without harming the psycho-visual quality of the picture reconstructed from the sub-sampled picture. To each electronic picture point, there is assigned a displacement vector, computed according to a WALKER and RAO type of algorithmic process of prediction/correction, the predicted value of motion of the current point being the value of the original displacement vector associated with a point of origin of the preceding picture, so that said current point is the approximate projection of said point of origin along said original displacement vector.

13 Claims, 8 Drawing Sheets

MULTI-PREDICTIVE METHOD TO ESTIMATE THE MOTION OF THE POINTS OF AN ELECTRONIC PICTURE

BACKGROUND OF THE INVENTION

1. Field of the Invention

The field of the invention is the analysis and encoding of electronic pictures and, more particularly, the analysis of the motion of the points of electronic pictures of this type.

2. Description of the Prior Art

In the specific example which shall be described in detail below, the method according to the invention can be applied to the analysis of high definition picture sequences, designed to be transmitted through a channel with a limited throughput. A preferred application of this type is the transmission of high definition television on MAC channels.

However, the method of the invention can also be used in any system analyzing a sequence of pictures (for example in robotics, target-tracking, searching for spatial and/or temporal parameters, etc.).

The method according to the invention is designed to be part of a picture processing chain and to form a link in the analysis of the displacement speeds of picture points in the picture plane.

An analysis of this type is valuable in a great many ways.

For the transmission of picture sequences in a channel with limited throughput, the processing of pictures is designed to reduce the volume of data transmitted, in such a way that:

- at emission, a sub-sampling operation is performed, the sub-sampling data being accompanied by "assistance data" transmitted conjointly via the data channel;
- at reception, a reverse operation is performed, consisting in the use of the assistance data and the sub-sampled signal to restitute a high definition signal.

In this scheme, the picture point motion estimation step, according to the present invention, occurs, for example, prior to the sub-sampling operation. The purpose of motion estimation, then, is to create a spatial-temporal data base, wherein the pieces of data represent the motional activity of the points, in the plane of the picture and in time. These are pieces of data which will make it possible to determine the most appropriate processing operation to accomplish the compression of data by sub-sampling.

An already known method in the field of data compression processing operations, with picture motions taken into account, is the one for the analysis of structures in spatial-temporal sub-sampling of an HDTV signal with a view to its transmission in an MAC channel as described in the proceedings of the HDTV 87 colloquium, Ottawa, 4th to 8th October, 1987, Vol. 1, pp. 6.2.1 (P. BERNARD, M. VEILLARD, CCETT). In this known method of analysis, each picture in the sequence is divided into zones, and each zone systematically undergoes three parallel processing operations in three distinct linear filters. Each filter provides for a different sub-sampling filtering operation, corresponding to a preferred filtering operation for still (motionless) pictures, pictures in moderate motion and pictures in fast motion, respectively. The outputs of the filters are then compared with the original source, and the best type of filtering is selected to determine the effectively transmitted, compressed signal.

A battery of linear filters of this type has the drawback of enabling only a limited choice among only three types of sub-sampling filtering operations, without the possibility of making the filtering operation more specifically to each particular feature of the zones processed. It has been noted, in particular, that there is a heterogeneity in the definition of distinct zones within one and the same picture, as well as low-level performance by this system in the processing of slow motions. This problem appear very clearly for example, in a very troublesome way for the viewer, when a slow motion is stopped or, again, when a still object is put into motion. In these instances, there is a sudden transition, from a blurred definition of the moving object to a maximum definition of a still object in the former case, and vice versa in the latter case.

A more refined, prior art approach to the problem of the encoding of a sequence of pictures consists, then, in making an a priori estimation of the motion in the picture sequence.

In this respect, T. S. HUANG ("Image Sequence Analysis: Motion Estimation" in Image Sequence Analysis; Ed. T. S. HUANG, Springer Verlag 1981) identifies three distinct methods, namely the FOURIER method, the "correspondence" or block matching method and the method using spatial or temporal gradients. The former two methods have a certain number of drawbacks. The FOURIER method is associated with a problem of phase indeterminacy and assumes uniformity of the picture background. The block-matching method appears to be likely to entail complex operations for processing the signal, for which attempts at simplification appear to cause risks of divergence in the processing algorithm.

Among methods using spatial and temporal gradients, a number of proposed algorithms are known: LIM, J. O. and MURPHY J. A., "Measuring the Speed of Moving Objects from Signals", IEEE Trans. on Com., April 1975, pp. 474–478; NETRAVALI, A. N., ROBBINS, J. D. "Motion Compensated Television Coding: Part I", BSTJ, Vol. 58, No. 3, March 1979, pp. 631–670; SABRI, S., "Motion Compensated Interframe Prediction for NTSC Color TV Signals", IEEE Trans. on Com., Vol. COM 32, No. 8, August 1984, pp. 954–968; ROBERT, P. "Définition d'un Schéma de Codage Multimodes avec Compensation de Mouvement pour les Séquences d'Images de Télévision" (Definition of a Multimode Encoding Scheme with Motion Compensation for Television Picture Sequences), IRISA thesis, November 1983; LABIT, C. "Estimation de Mouvement dans une Séquence d'Images de Télévision" (Estimation of Motion in a Television Picture Sequence), IRISA thesis, Rennes, February 1982; WALKER, D. R., RAO, K. R. "New Technique in Pel-Recursive Motion Compensation" ICC 1984, Amsterdam, pp. 703–706.

These known estimation methods come up, in fact, against three types of limits:
- limits related to the algorithmic method chosen;
- limits related to the recursive design of most of the algorithms;
- limits related to the choice proposed for the starting hypothesis of the estimation algorithms.

With respect to the limits for algorithmic methods, the known methods can essentially be classified under two groups: algorithms that seek the components of the speed vector attached to a block of pictures (block matching) and algorithms that seek the components of the speed vector attached to a picture point. The criteria used to choose either of the algorithmic methods are essentially related to the complexity of the processing operations used, and to the psycho-visual perception of the relative efficiency attached to each technique.

For the method according to the invention, it has been chosen to work preferably with a pel-recursive motion estimator and, preferably but not restrictively, with the motion estimator as described by WALKER and RAO. The reasons for this choice, which are part of the inventive step that has resulted in the method, shall appear below.

It will be noted that the method nevertheless applies equally well to the block motion estimation, each block being capable of being represented by a single representative, which may be vectorial as the case may be.

The second limit is related to the recursive character of most of the known algorithms. Recursivity has the drawback of requiring several computation loops to estimate the motion of a point. These operations are, therefore, necessarily sequential, since the order n estimation can be assessed only after the order n−1 estimation is known. At current TV frequencies, this method is incompatible or, at the very least, disadvantageous.

Finally, a third type of limitation is related to the initialization mode presently recommended for known motion estimation algorithms, and essentially for estimation algorithms known as pel-recursive algorithms. Moreover, these initializing modes are generally related to the algorithmic technique and to the mode of recursivity chosen. From this point of view, it is possible to distinguish two main techniques of recursion corresponding to an improvement in point motion estimation, depending either on a spatial interpolation (see, for example, A. N. NETRAVALI, J. D. ROBBINS, already cited; P. ROBERT, C. CAFFORIO, F. ROCCA "Time/Space Recursions for Differential Motion Estimation", 2nd Internat. Tech. Symp. on Optical and Electro Optical Applied Science and Engineering, Cannes, December 1985; B. K. P. HORN, B. G. SCHUNCK, "Determining Optical Flow", Artificial Intelligence, Vol. 17, pp. 185-203, 1981; W. ENKELMANN, "Investigations of Multigrid Algorithms for the Estimation of Optical Flow Fields in Image Sequences", Workshop on Motion: Rep. and Analysis, IEEE, May 1986, Charleston), or a temporal interpolation (Y. NINOMIYA, Y. OHTSUKA, "A Motion Compensated Interframe Coding Scheme for Television Pictures", IEEE Transactions, Vol. Com. 30, No. 1, January 1982, pages 201-211; R. PAQUIN, E. DUBOIS "A Spatio-Temporal Gradient Method for Estimating the Displacement Vector Field in Time-Varying Imagery", Computer Vision, Graphics and Image Process, Vol. 21, 1923, pp. 205-221). The temporal interpolation is more especially suited to the processing of still picture sequences whereas the spatial interpolation is essentially satisfactory for fast picture sequences. By contrast, the available laws are ill-suited to slow motions for which they show high degree of directional streaking, causing substantial and incoherent pollution in operations for the processing of picture encoding.

OBJECTS OF THE INVENTION

The method according to the invention is particularly aimed at overcoming all the drawbacks of the prior art.

More precisely, a first object of the invention is to provide a method for the estimation of the motion of electronic picture points, in the plane of the picture, by means of fast, convergent and adaptive processing, particularly with the aim of enabling a subsequent, efficient processing operation for the sub-sampling of the picture sequence, without damaging the psycho-visual quality of the picture reconstructed from the sub-sampled picture. This application is given by way of indication.

A second object of the invention is to provide a motion estimating method of this type which is independent of the picture format. The method applies to both the 4/3 format and the 16/9 format (HDTV).

Another object of the invention is to provide a motion estimation method of this type which can be implemented by wired circuit, in reducing the number and cost of the constituent elements and, notably, the capacity of the buffer memories used to the minimum.

The invention also has several additional sub-goals related to the specific solution developed further below. Among these sub-goals are the resolving of conflicts in the interpretation of the motion of points or, again, the management of screen edges.

An additional object of the invention is to provide a method of this type which is compatible, at least one of its versions, with currently used processing systems, especially in the application of the invention to the encoding of HDTV for MAC channels.

Another object of the invention is to enable the accomplishing of motion estimation in using the principle of various types of algorithms, either known or yet to be developed, such as, for example, the WALKER and RAO algorithm or, again, ROBERT, CAFFORIA and ROCCA algorithm, both already mentioned.

Another object of the invention is to provide a picture encoding method that includes the motion estimation method with the above-mentioned qualities, said encoding method also having decision means for the selective use of an appropriate encoding among several available encoding possibilities. An encoding method of this type should be capable, in particular, of optimizing the encoding of both still pictures and moving pictures, in slow or fast motion, or again, the encoding of zones of spatial-temporal breaks (contours, sudden changes in motion etc.) without causing any processing delay.

SUMMARY OF THE INVENTION

These objectives, as well as others which shall emerge subsequently, are achieved by means of a motion estimation method for electronic picture sequences, designed notably to assign, to each electronic picture point, a displacement vector in the plane of the picture at the instant t, with the aim, for example, firstly of performing an optimized compression processing of the picture signal and/or, secondly, enabling the achievement of an approximate projection of the position of the picture t in the following picture at the instant (t+1), wherein said current displacement vector of a current point at the instant t is computed according to an algorithmic prediction/correction process in which a prediction value of motion is taken as a starting hypothesis for computation, said predicted value being subsequently corrected within the process according to a method of correction by optimization of criteria, and wherein said predicted value of the motion of the current point is the value of the original displacement vector associated with a point of origin of the picture at the instant (t−1), said current point being the approximate projection of said point of origin along said original displacement vector.

Advantageously, said prediction/correction process is of the "pel-recursive" algorithm type and, in particular, of the type of algorithm presented by WALKER and RAO or, again, the algorithm of ROBERT, CAFFORIO and ROCCA.

Another notable object of the invention is a method of motion estimation for electronic picture sequences, particularly designed to assign, to each electronic picture point, a displacement vector in the plane of the picture at the instant t, with the aim, for example, firstly of achieving an optimized compression processing of the picture signal and/or secondly, of enabling the achievement of an approximate projection of the position of each picture point at the instant (t+1), wherein said current displacement vector of a current point at the instant t is computed according to an algorithmic prediction/correction process in which a predicted value of motion is taken as a starting hypothesis for computation, said predicted value being subsequently corrected within the process according to a method of correction by optimization of criteria, and wherein, said method achieves, in parallel, at least two computations of motion estimation using two predicted values of motion of the current point, said predicted value being chosen from among the following values:
at least one spatial prediction of motions;
at least one temporal prediction of motions;
at least one spatial-temporal prediction in the axis of the motion;

and wherein
said method chooses the estimation of the speed vector according to a method of decision by optimization of criteria.

BRIEF DESCRIPTION OF THE DRAWINGS

Other features and advantages of the invention will appear from the following description of detailed embodiments of the invention, given by way of illustration, and from the appended drawings, wherein.

DEFINITIONS

Figure 1:
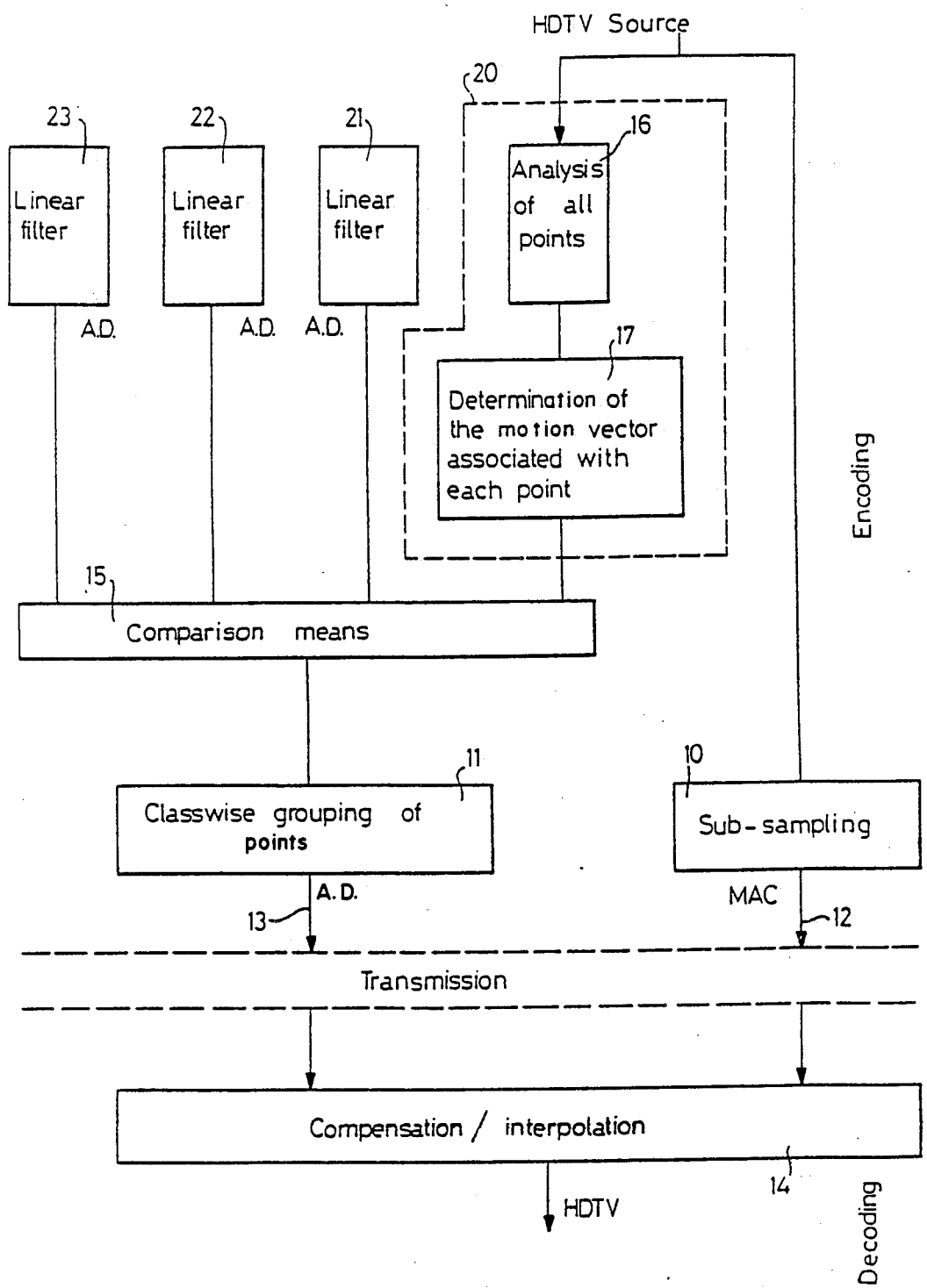
FIG. 1 is a block diagram locating the motion estimation method according to the invention in an encoding/decoding line for the transmission of an HDTV signal through a MAC channel.

Motion estimation: signal processing method designed for determining, at a point (or a block of points) of a framed, original picture, of the displacement vector of this point from one picture to the next one, with respect to the "frame" of the sequence of pictures.

Motion compensation: signal processing method using the displacement vector at a point (or a block of points) to interpolate the signal received at the decoder in order to obtain an HD picture in HDTV display.

Criterion for measurement of the fit of the computed motion vector: DFD ("displaced frame difference") ("difference between luminance values of the source point (t−1) and the target point (t) associated by the computed speed vector") according to the estimation algorithm of WALKER and RAO; the search for the optimum motion vector (dx, dy) at the point (x, y) of the picture t consists in seeking, in the picture (t−1), the coordinate point (x−DX, y−Dy) such that the DFD defined by $$DFD = |I(x, y, t) - I(x - Dx, y - Dy, t-1)|,$$

is minimal, with:
x = abscissa of picture point;
y = ordinate of picture point;
t = instant corresponding to the scanning of a picture;
t−1 = instant corresponding to the scanning of the picture preceding the picture of the instant t;
I(x, y, t) = luminance of the point (x, y) of the picture of the instant t.

Pel-Recursive Algorithms

A pel-recursive motion estimation technique basically involves computing a motion displacement and then separating the pels into predictable and unpredictable segments.

More precisely, displacement is estimated for each pel. The transmitter duplicates the receiver prediction process and transmits error signals when the pels are not successfully predicted. The prediction error is quantized and transmitted. The receiver then adds the quantized error signal to the predicted value, providing a correct pel value, subject to the quantization noise. Addresses of the pels which are unpredictable must be transmitted also. For the pels which can be predicted with the motion prediction algorithm, no data need be transmitted. The result is better quality but higher transmission rates. There is a technique, by Netravali and Robbins called "Pel Recursive Motion Compensation." The algorithm updates the motion estimate at each pel. As iterations of the algorithm continue from pel to pel the motion estimates converge toward the true displacement. Once acquisition of the true displacement of an object is obtained, the displacement can be used to predict the values of succeeding pels. The original algorithms are slow to converge, i.e., many iterations are required to obtain an accurate displacement estimate.

Walker and RAO present extensions of those algorithms, which improve the convergence rate substantially making one iteration per pel more effective. Also, a different scheme for using the motion estimate is presented which eliminates explicit address transmission.

Let I($\underline{z}$, n) be the intensity of a pel at location $\underline{z}$ in frame number n, where $\underline{z} = (x,y)$, the horizontal and vertical coordinates respectively. A frame difference (FD) is defined as $$FD = I(\underline{z}, n) - I(\underline{z}, n-1) \quad (1)$$

If an object is moving then its estimated interframe displacement can be represented by $\hat{D}$. A displaced frame difference (DFD) is defined as $$DFD(\underline{z}, \hat{\underline{D}}) = I(\underline{z}, n) - I(\underline{z} - \hat{\underline{D}}, n-1) \quad (2)$$

If there is no error in $\hat{\underline{D}}$, $\hat{\underline{D}} = D$, the DFD should be zero, since ideally the pel values are identical. A displacement $\hat{D}$ can then be sought which will cause DFD to approach or equal zero. Since DFD is a function of intensity values then $\hat{D}$ will be a function of the intensity. Algorithms for estimating $\underline{D}$ have been derived from the Taylor series with necessary approximations. For the 2D case, the Taylor series approximation is:

$$I(\underline{z} - \hat{\underline{D}}^i, n-1) = I(z - \hat{\underline{D}}^{i-1}, n-1) + \quad (3)$$
$$(\hat{\underline{D}}^{i-1} - \hat{\underline{D}}^i) \cdot \text{grad } I(\underline{z} - \hat{\underline{D}}^{i-1}, n-1)$$

where grad $I(z\hat{D}^{i-1}, n-1)$ is the gradient of I at location $\underline{z} - \hat{D}^{i-1}$ in frame $n-1$. $\hat{D}^{i-1}$ and $\hat{D}^i$ are old and new motion vector estimates.

From equations (2) and (3) one obtains:

$$DFD(\underline{z}, \hat{\underline{D}}^i) = DFD(\underline{z}, \hat{\underline{D}}^{i-1}) - (\hat{\underline{D}}^{i-1} - \hat{\underline{D}}^i) \cdot$$
$$\text{grad } I(\underline{z} - \hat{\underline{D}}^{i-1}, n-1)$$

If $\hat{D}^i$ is exact, then the DFD will be zero. In practice, for many reasons, an exact match will seldom be found. Therefore a threshold is set. If $|DFD|$ is less than the threshold, $\hat{D}^i$ is considered acceptable.

Thus, the WALKER and RAO pel-recursive algorithm is defined by:

$$\hat{\underline{D}}^i = \hat{\underline{D}}^{i-1} - \frac{\epsilon DFD(z \cdot \hat{D}^{i-1}) \text{grad } I(z - \hat{D}^{i-1}, n-1)}{\text{correction term}}$$

$$\text{where } \epsilon' = \frac{1}{2} \frac{1}{(|\text{grad } I(z - \hat{D}^{i-1}, n-1)|)^2}$$

The spatial interpolation of ROBERT, CAFFORIA and ROCCA as described in their above identified article, considers two pel-recursive estimators:

$$\hat{v} = \hat{v}_g - c^* DTC^* \underline{\nabla} I \quad NC$$

where:
$\hat{v}$ is the updated motion estimation,
$\hat{v}_g$ is the "guessed" value of motion for the actual pixel, before updating.

$$\hat{v} = \hat{v}_g - DTC^* \underline{\nabla} I / (\epsilon^2 + |\nabla I|^2) \quad CR$$

The differential recursive estimator (CR) has the gradient algorithm structure, with a variable gain. In comparison with (NC):

$$c = 1/(\epsilon^2 + |\underline{\nabla} I|^2)$$

The constant factor $\epsilon^2$ accounts for the noise and the simplified image model.

The purpose is to minimize the entropy of the prediction error DTC after interframe motion compensation ($\rho$ is the time interval between the images considered):

$$DTC = I(x,t) - \tilde{I}(\underline{x} - \tilde{\underline{v}}(x) \cdot t - \rho)$$

A significant improvement is achieved by combining the current and previous frame spatial gradients:

$$\nabla I = \frac{\nabla I(x, t) + \nabla I(x - \tilde{v}_g, t - \rho)}{2}$$

A solution to instability caused by small values for $\epsilon^2$ is to increase the sensitivity to useful signal (for motion measure) and to introduce an external control of the algorithm. A measure of the motion estimation accuracy for the current pixel can be defined as:

$$DTCR = \tilde{I}(x,t) - \tilde{I}(\underline{x} - \hat{\underline{v}}(x), t - \rho)$$

DTCR is the displaced frame difference of the reconstructed current pixel, using its motion estimation $\hat{v}$.

The solution here presented compares the simple frame difference DTNC and DTCR as a control of the algorithm accuracy:
  a. $\hat{v}(\underline{x})$ is obtained on the reconstructed current pixel X
  b. DTNC and DTCR are computed on X, using $\hat{v}(\underline{x})$:

$$DTNC = \tilde{I}(\underline{x}, t) - \tilde{I}(\underline{x}, t - \rho)$$

$$DTCR = \tilde{I}(\underline{x}, t) - \tilde{I}(\underline{x} - \hat{\underline{v}}(x), t - \rho)$$

c. The final motion estimation $\hat{v}$, $(\underline{x})$ for the reconstructed current pixel X is defined as follows:
  if $|DTCR| < \mu$ then the measure is correct.
  if $|DTCR| > \mu$ then the following test defines the motion estimation:
    if $|DTNC| < |DTCR|$ then $\hat{v}(\underline{x}) = 0$
    if $|DTNC| > |DTCR|$ then again the measure is correct.

Context of the Presented Embodiment

The embodiment of the invention presented below forms part of the design and making of an encoding and decoding scheme for an HDTV picture source with a view to its transmission on MAC channels.

FIG. 1 shows a block diagram locating the motion estimation method, according to the invention, in an encoding/decoding line for the transmission of an HDTV signal through a MAC channel. The embodiment of FIG. 1 corresponds to a specific version, compatible with already existing systems, including parallel processing operations by linear filters and an a posteriori encoding.

The HDTV signal encoding stage comprises the steps of:
  (1) sub-sampling the picture source (after filtering if any) to reduce the number of pieces of video information in order to meet the MAC standard (step 10),
  (2) processing the HDTV source sequence at the encoder to transmit spatio-temporal data (assistance data) relating to said frequency (a step 11).
The decoding stage 14 consists in:
  (1) receiving the transmitted MAC signal, which corresponds to the sub-sampled source picture;
  (2) in the event of reception on a standard television receiver, displaying the received picture without taking complementary data into account. This is what is called the compatible picture; and
  (3) in the event of reception on an HD television receiver, processing the additional data to reconstruct a high definition HDTV picture through an appropriate interpolation and compensation system 14.

It will be noted that, advantageously, the sub-sampled video signal is transmitted in the luminance MAC channel 12 while the pieces of assistance data 13, resulting from the step 11, are transmitted through the associated "data channel" (cf. MAC transmission standard).

In the diagram of FIG. 1, it is noted that the step 11 for generating assistance data 13 is supplied by means 15 for the comparison of results of filtering and motion estimation, performed in parallel in circuits 20, 21, 22, 23. The circuits 20, 21, 22, 23 correspond to standard circuits for filtering by means of linear filters. The three channels 21, 22, 23 correspond, respectively, to filtering adapted to a still picture zone, a slow motion zone and a fast motion zone.

As for the circuit 20, it corresponds to the implementation of the motion estimation method according to the invention, comprising a step 16 for the analysis of all the picture points and a step 17 to determine the speed vector associated with each picture point.

This embodiment corresponds to an a posteriori encoding system in the sense that the HD picture source signal simultaneously undergoes, in parallel in each of the circuits 20, 21, 22, 23, a filtering/motion estimation operation, the optimum encoding processing being selected a posteriori, in the comparator circuit 15.

In an embodiment, which is more efficient but not compatible with existing systems, the motion estimation method according to the invention is performed upline of the filtering operations, and the results obtained at the output of the circuit 20 condition the use, if any, of one of the filters 21, 22, 23, when the estimated motion value calls for it. In fact, in an embodiment of this type, which may be called "a priori encoding", only the filters 21 and 23, for still zones and fast motion zones respectively, are kept. The filtering operation of either of these filters 21, 23, may then be chosen, as being optimal, in the case of an estimation of an absence of motion or an estimation of fast motion.

Motion Estimation

The purpose of motion estimation is to associate, with each point of a standard picture t, the displacement vector of this point between the pictures t−1 and t.

The knowledge of each displacement vector would thus make it possible, in the case of a continuous motion (with respect to the scan speed), to send only one in two pictures through the MAC channel, each untransmitted picture being capable of being deduced from the immediately preceding picture by a displacement of the preceding picture points along their associated displacement vector. Gaps, if any, in the reconstructed picture, may then be filled in by interpolation.

It is assumed here that the high definition picture sources are perfectly known and non-interlaced.

Numerous motion estimation algorithms have been developed and have been cited, in particular, in the introduction. Their role, in the case of each algorithm, is to associate, with each point of the picture t, a vector which makes it possible to know the position that each point had in the picture t−1.

The motion estimation method chosen for the present embodiment is the previously-mentioned "pel-recursive" method of WALKER and RAO. To estimate a displacement, this method uses a prediction (hence a probable initial value) of the displacement, and a correction function. This correction function depends on a local spatial gradient (grad), a variable gain computed from the gradient and a difference in luminance marked DFD.

The DFD measures the difference in luminance between the current point and its corresponding point in the previous picture identified by the motion vector.

This DFD value is a fundamental notion of the method according to the invention, inasmuch as it is used, not only in the application of the WALKER and RAO algorithm for estimation in the direction of motion according to the invention, but also for operations to compare the results of filtering and motion estimation; this comparison makes it possible to determine the best method for the encoding/sampling of the transmitted signal.

The WALKER and RAO method is known as an iterative method, with single prediction.

Figure 2:
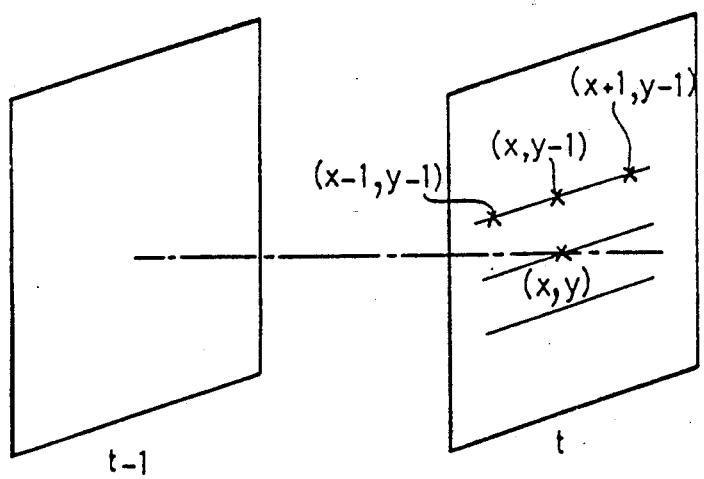
FIG. 2 illustrates the estimation of motion with spatial prediction.

The predictions used in the known way up till now are of two types:

spatial prediction (FIG. 2): the motion of the point (x, y) is predicted as having to be close to the motion of one of the spatially adjacent points in the picture t, for example either the preceding point belonging to the same line (x−1, y, t) or, again, one of the near points belonging to the previous line (x, y−1, t), (x−1, y−1, t), (x+1, y −1, t).

Figure 3:
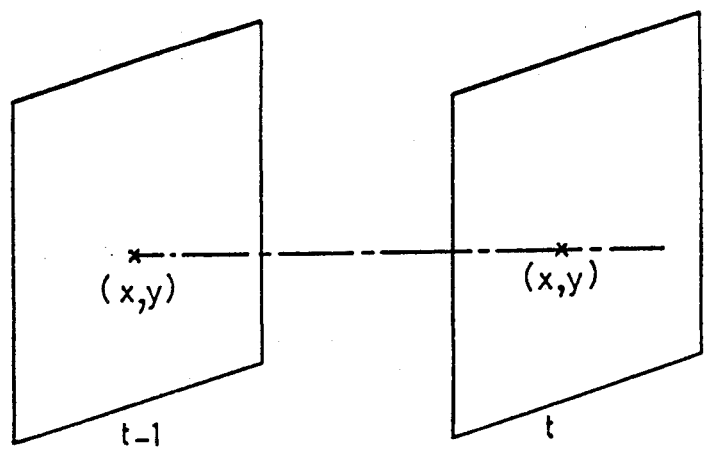
FIG. 3 illustrates the estimation of motion with temporal prediction.

This prediction is satisfactory for estimating the motion of spatially extended objects in fast displacement in the picture.

temporal prediction (FIG. 3): the prediction selected for the displacement vector of the point (x, y, t) is the estimation which had been computed for the point (x, y, t−1) in the previous picture (t−1).

This type of prediction is clearly optimal in the case of a still picture sequence and, more precisely, still picture zones.

These known methods of estimation are useful but quite insufficient as explained in the introduction, and have led to the development of the following three aspects of the method according to the invention:

the use of a prediction of the displacement vector in the axis of the motion;

the working of the method in "multi-prediction";

the integration of the method for prediction in the axis of motion and/or the multi-prediction method in an encoding line including linear sampling filters, with operation in either a priori mode or a posteriori mode. This alternative has already been presented above.

Figure 4:
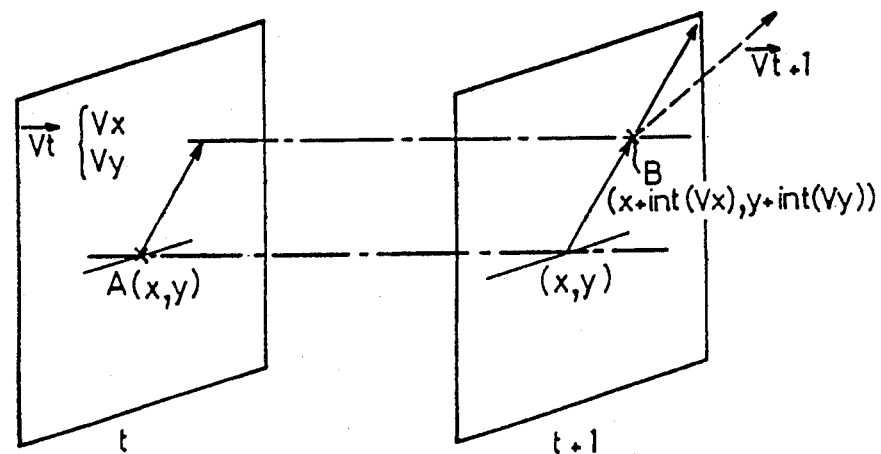
FIG. 4 illustrates the prediction of motion in the direction of the motion.

Description of the Prediction in the Direction of Motion:

The prediction in the direction of motion consists in the point-by-point projection of the field of the motion vectors of the picture t in the picture t+1. This projection will be done along the whole parts of the components Vx and Vy in order to end at a sampled point of the picture t+1 (FIG. 4). Thus, in the case of the point A (x, y, t) of the estimated displacement vector $V_t$(Vx, Vy), its projection in the picture (t+1) is the point B. This point B will have, assigned as a prediction value, $P_{t+1}$, the vector of components:

Px=Vx and

Py=Vy and its spatial position in the picture t+1 will be:

x+int(Vx)

y+int(Vy)
if x and y are the coordinates of the point (x, y, t) of speed vectors (Vx, Vy). The time interval between two successive pictures is taken to be equal to 1. The function "int" designates the closest whole number value of the value contained in the brackets.

The vector $\vec{P_{t+1}}$ is then used in at least one iteration of the estimation method of WALKER and RAO in order to obtain, after correction, an estimated vector $\vec{V_{t+1}}$ at the point B(t+1).

Before starting the projection of the speed vectors, an initialization stage consists, at any point (x, y, t+1) of the best destination picture, in filling the following tables:

Px(x, y, t+1)=0 (horizontal component of the prediction)

Py(x, y, t+1)=0 (vertical component of the prediction)

DTD(x, y, t+1)=31 (absolute value of DFD, limited to 31).

AXY (x, y, t+1)=0 (marker of validation of the prediction at the current point).

The limitation of the value of DFD corresponds to the constraint of obtaining a limited difference in luminance, between the preceding source point and the current target point. The digit 31 taken as a maximum value for the DFD is not a characteristic that restricts the invention, but corresponds to an accurate experimental value, according to the initial tests, it being known that the luminance may assume 255 distinct values.

A second limitation consists in the restricting of the intensity of the predicted and estimated displacement vectors to a maximum value. This amounts to the removal of the fast moving points from the process for the prediction/correction of the picture point motion vector estimation. In one preferred embodiment of the invention, the coordinates (vx, vy) of the motion vectors are limited to +/−15.

If, through the application of one of the two above limitations, the computation of the motion picture vector for a picture point should have to be interrupted, the marker AXY of the validation of the current point prediction would be kept at zero. The assistance data relating to this point could therefore not be determined by an estimation in the direction of motion, but, possibly, by temporal or spatial estimation or, again, by linear filtering or interpolation.

It will be noted, however, that one and the same point of the picture t+1 may be a source point of several target points of the preceding picture. In this case, this point will be really deprived of prediction, according to the method for estimation in the axis of motion, only if none of the source points is capable of giving a valid prediction for this point.

The simulation algorithm of the method of the invention has, as input data, the point (x, y, t) of the picture t, with the estimated speed (Vx, Vy), with the intensity I(x, y, t), also marked Io.

The result is to assign, to the point (x+int(Vx), y+int(Vy), t+1) of the picture t+1, a predicted speed, with components:

$$Px(x+\text{int}(Vx), y+\text{int}(Vy), t+1) = Vx$$

$$Py(x+\text{int}(Vx), y+\text{int}(Vy, t+1) = Vy.$$

This point of impact has the intensity I(x+int(Vx) y+int(Vy), t+1), also marked I1.

An absolute displaced difference is then determined as being the function |Io−I1|

The algorithm has three possibilities, called validation, rejection, mean.

The Validation situation is the following one: if:

$$|Io-I1| < DTD(x+\text{int}(Vx), y+\text{int}(Vy), t+1)$$

then:

$$Px(x+\text{int}(Vx), y+\text{int}(Vy), t+1) = Vx(x, y, t)$$

$$Py(x+\text{int}(Vx), y+\text{int}(Vy), t+1) = Vy(x, y, t)$$

$$DTD(x+\text{int}(Vx), y+\text{int}(Vy), t+1) = |Io-I1|$$

$$AXY(x+\text{int}(Vx), y+\text{int}(Vy), t+1) = 1$$

The instruction: DTD=|Io−I1| means that the value |Io−I1|, smaller than the initial content of DTD, replaces this content.

The marker AXY assumes the value 1 when a prediction is validated.

The Rejection situation is the following one:
If, $$|Io-I1| > DTD(x+\text{int}(Vx), +\text{int}(Vy), t+1)$$

then no table is modified. This case concerns, therefore, the speed vector projections which give a very poor prediction, for the absolute displaced difference |I-o−I1| is great (greater than 31 in the example taken herein). This case also concerns a second candidate vector, which is rejected because the absolute displaced difference deduced from this candidate is greater than that of a first validated candiate (this procedure being concerned with the conflict of multiple condidates at one point of the picture t+1; see further below).

The Mean situation is the following one:
If $$|Io-I1| = DTD(x+\text{int}(Vx), y+\text{int}(Vy), t+1)$$

then, the vector (Vx, Vy) is averaged with the current content of the projection (Vx(x+int(Vx), y+int(Vy), t+1; Py (x+int(VX), y+int(Vy, t+1). The result is again memorized at the point (x+int(Vx), y+int(Vy), t+1). The marker AXY(x+int(Vx), y+int(Vy), t+1) is set at 1. The value of the mean is that the potential condidates are weighted identically except if three (or more) candidates appear (a case which is statistically far too rare to be dealt with).

A simplified use of the method consists in stopping its progress here. In this case, the table AXY may be eliminated.

Figure 5A:
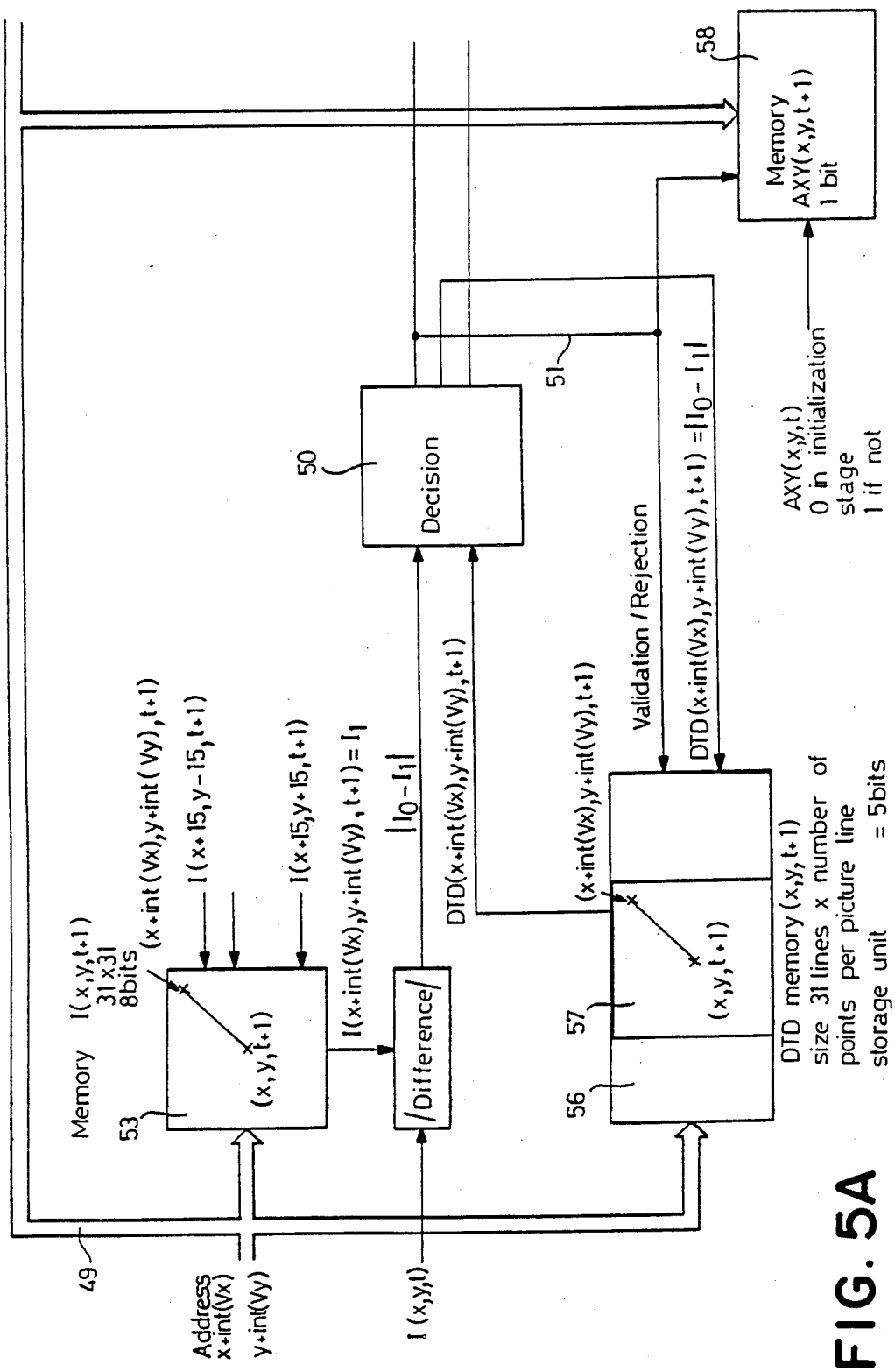
FIGS. 5A, 5B illustrate the process for assigning a prediction value for each point with "multiple candidate" conflict resolution, and without resolution of "no candidate" conflict.
Figure 5B:
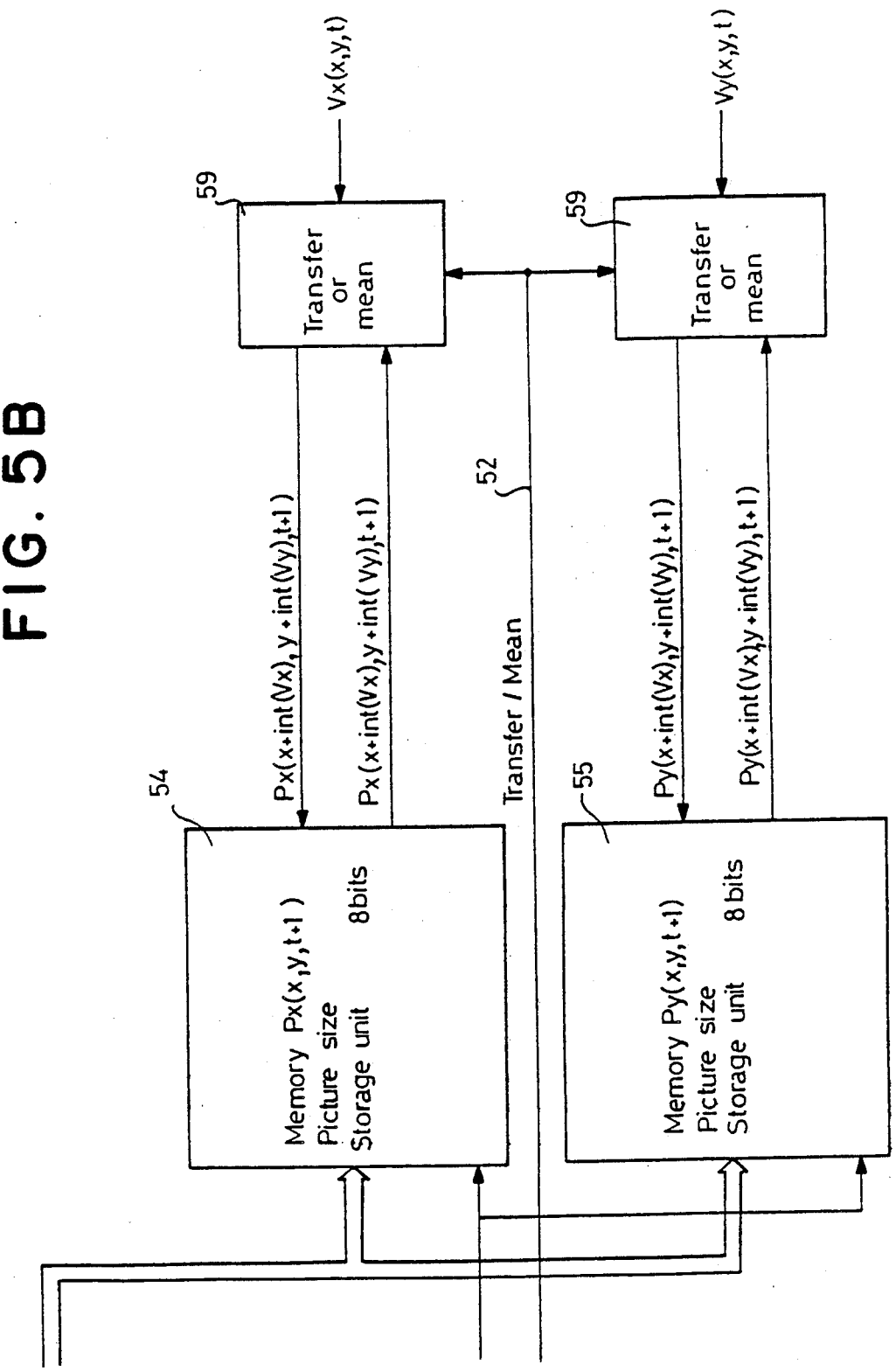

A block diagram of circuits implementing the invention is shown in FIGS. 5A and 5B.

The current point address flows in the address bus 49.

The storage units of the memories 53, 54, 55, 56, 58 take into account the following ranges and specific information:

Vx, Vy, Px, Py: +/−15, precision ⅛, hence 8 bits:
DTD≦31: positive whole number value, hence 5 bits;
I: intensity encoded on the eight bits.

With respect to the points (x, y, t) of speed (Vx, Vy), it all happens in the picture t+1 at the point (x+int(Vx), y+int(Vy), t+1). Consequently, the storage address of the validated data is defined by x+int(Vx) and y+int(Vy).

A block 50, called a Decision block, processes the values |Io−Il| and DTD(x+int(Vx), y+int(Vy), t+1) according to the above-described situations, namely validation, rejection and mean. A "validation/rejection" piece of information 51 enables the storage or non-storage of a re-updated DTD and the components Px, Py at the indicated address.

A "transfer/mean" piece of information 52 overwrites the preceding content Px(x+int(Vx), y+int(Vy), t+1) by the candidate Vx, and a similar process occurs between Py and Vy, the half sum is done between the preceding content Px and the candidate Vx, and, similarly, between Py and Vy. These new values are stored at the address (x+int(Vx), y+int(Vy), t+1) (circuits 59). The size of the memories takes into account the following effective dimensions:

Memory I 53 (x, y, t+1)→31×31, for the range is equal to +/−15
Memories Px 54(x, y, t+1)→one picture
Memories Py 55(x, y, t+1)→one picture
Memory DTD 56(x, y, t+1)→31×N
Memory AXY 58→1 bit N is the number of points per picture line. At a given instant, only one window 57, with a size 31×31, centered on the point (x, y, t+1), is accessible. The value of DTD should, however, be preserved on a length N and then re-used, if necessary, from another point of the picture t+1. In particular, the DTDs of any line L are possibly (depending on Vx and Vy) addressed until the line L+31 has been processed.

Management of Conflict in Prediction in the Axis of Motion

Three examples constitute cases of limits on the application of the method for motion estimation in the axis of motion. A special definition procedure has to be provided for these cases:
- the existence of "multiple candidates A for the projection" at a point B(t+1), that is, the existence of several picture source points A for which the estimated motion vector ends at the point B of the picture t+1;
- the existence of picture points B having no antecedents in the preceding picture;
- the management of edges of pictures.

Conflicts of the first type (with multiple candidates) are resolved by choosing, for prediction, that vector which gives a minimal DFD. In a preferred embodiment of the invention, already mentioned in the description of FIG. 5, and in case of equality between two or more DFDs, the mean is taken among the corresponding candidates.

The second example of conflict envisaged is that of the absence of a candidate source point A for a current point B of the current picture.

The method notably accepts the implementation of two approaches to solve a conflict of this type.

In the first approach, a predicted vector is assigned to the point B by spatial analysis of the environment of the point B in the picture t+1, and association of the points of one and the same object. This approach is efficient in finding the true field of speed vectors but is difficult to use in compensation (at reception) since the interpolation made at reception is a filtering in the direction of motion. This results when there is an overlapping or exposure, in the plane of the picture, between two moving objects or, again, between an object and the picture background.

The second approach, which is preferable for implementation, consists in making a search, around the point B having no candidate, for the neighbouring points that have a predicted vector in the picture t+1. Of these vectors, the one that gives a minimum DFD for the current point B is assigned. In the case of equality among two or more DFDs, the vector with a minimum module is chosen to prevent any risks of divergence.

A detailed embodiment of this approach is shown below with reference to FIGS. 6 and 7.

Owing to the non-bijectivity of the projection of the picture t, made point by point towards the picture t+1 and in parallel with the speed vector of the original point, picture points t+1 have no prediction Px, Py (AXY=0).

To these points, (x, y, t+1), there corresponds the information:

$$AXY(x,y,t+1)=0.$$

and, following the stage for initializing the system:

$$Px(x, y, t+1)=0$$

$$Py(x,y,t+1)=0$$

Let us therefore assume that, at the point (x, y, t+1), we have:

$$AXY(x,y,t+1)=0$$

The operations implemented to assign a prediction to this point (x, y, t+1) consist in:
(1) identifying, in the neighbourhood 61 of this point, those points which have a validated prediction (AXY=1)
(2) testing each validated prediction at the point (x, y, t+1)
(3) selecting (79) the prediction giving a minimum DFD.

Figure 6:
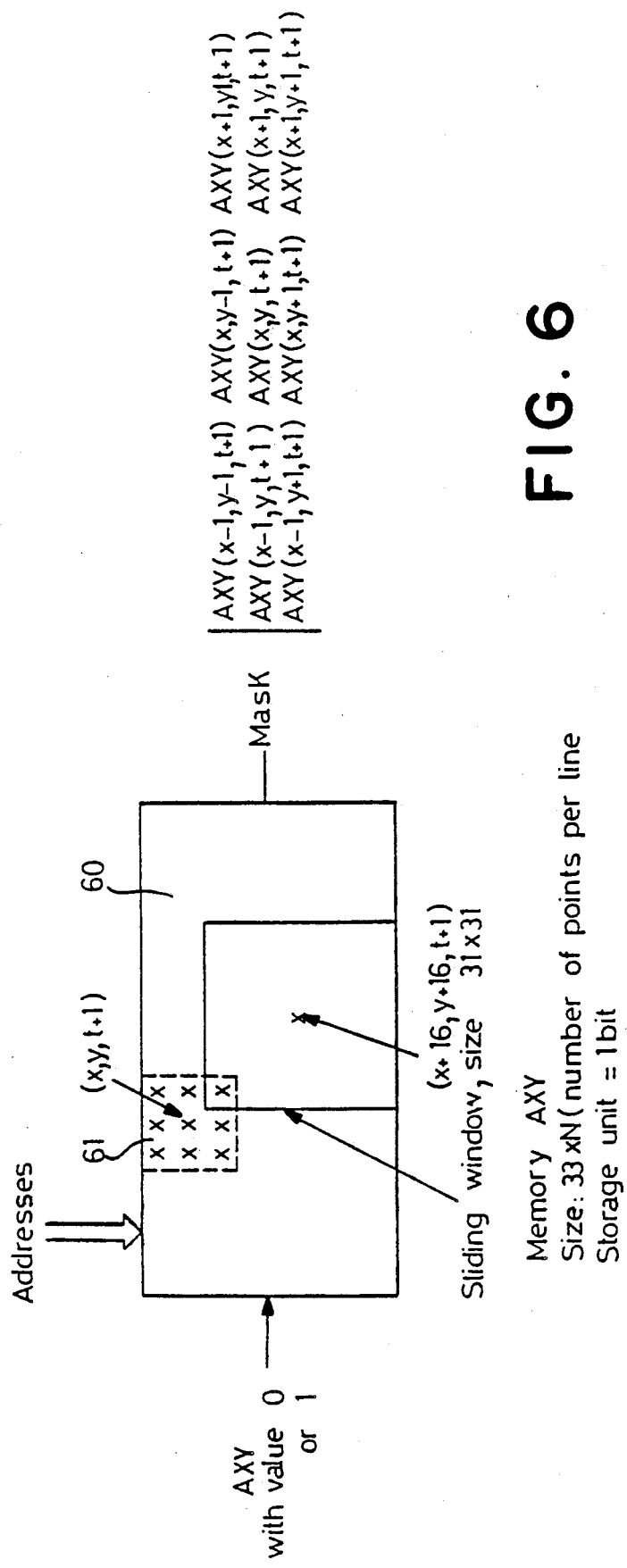
FIGS. 6 and 7 illustrate an embodiment of the method according to the invention, assigning a prediction to points without prediction.

The neighbourhood 61 is centered on the point (x, y, t) and is restricted to a size 3×3 (FIG. 6). The knowledge of the values:

$$AXY(x-1,y-1,t+1)$$

$$AXY(x,y-1,t+1)$$

$$AXY(x+1,y-1,t+1)$$

$$AXY(x-1,y,t+1)$$

$$AXY(x+1,y,t+1)$$

$$AXY(x-1,y+1,t+1)$$

$$AXY(x,y+1,t+1)$$

$$AXY(x+1,y+1,t+1)$$

enables the listing of those points that have had a previously validated prediction (AXY=1).

Take one of these points (i, j, t+1) for which Px(i, j, t+1) and Py(i, j, t+1) thus exist: it is then possible to compute:

$$Io = I(x - Px(i,j,t+1), y - Py(i,j,t+1), t)$$

$$- I_1 = I(x, y, t+1)$$

$$- |Io - I_1|$$

In calling:

$$IND = |I(x, y, t+1) - I(x, y, t)|$$

and: $DR = 15 \sqrt{2}$ (maximum module of a speed vector)

The algorithm of table I (set out below) is activated:

The value of the computation of the module DR makes it possible to choose the minimum value in case of equality.

Figure 7:
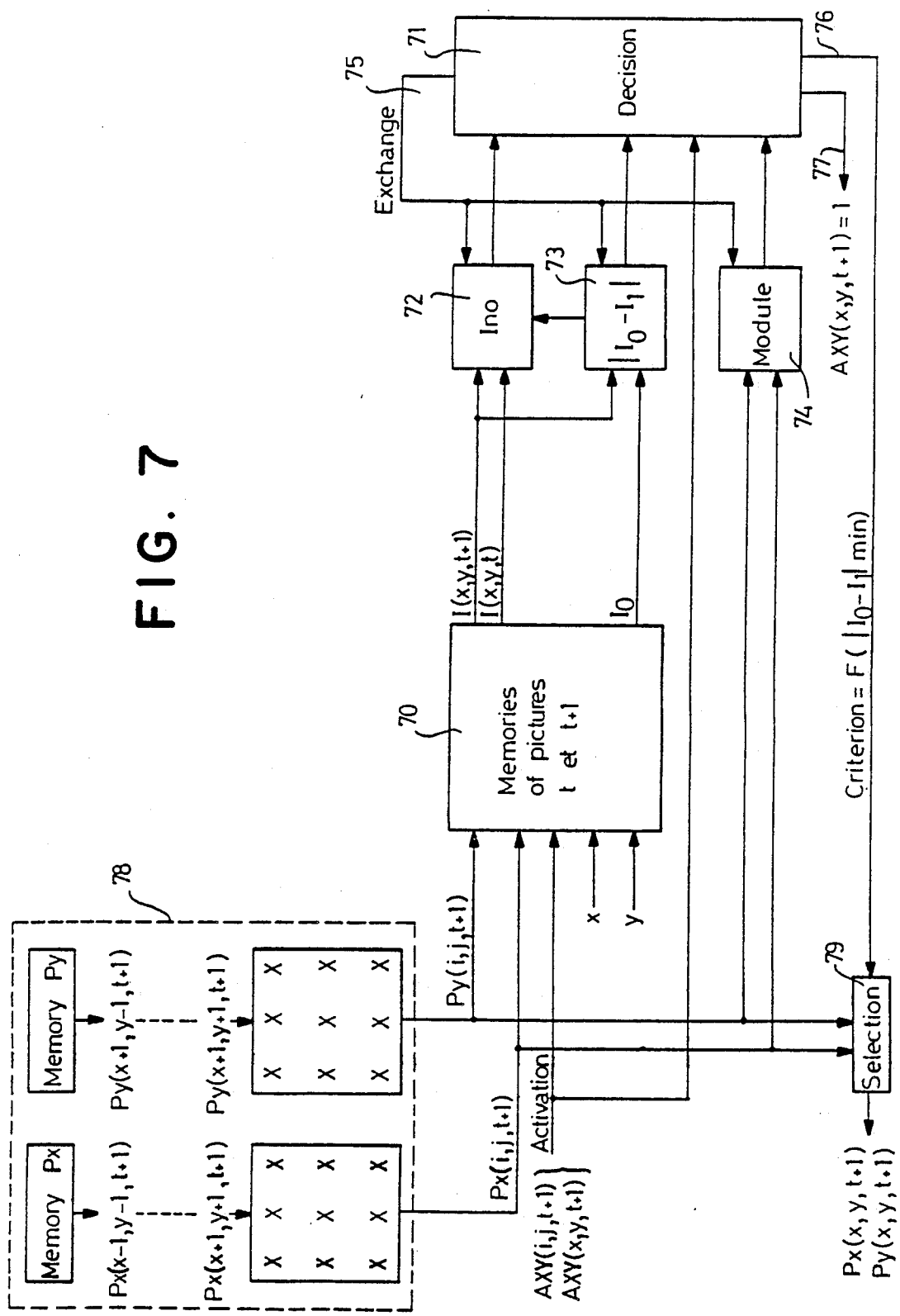

A block diagram of circuits implementing this algorithm is shown in FIG. 7.

The current point corresponding to the processing operation described in FIG. 5 has the spatial position (x+16, y+16) in the picture t+1. To have a stable environment around the point (x, y, t+1) this environment should, indeed, no longer be modified and should, therefore, be outside the range of the greatest displacement (+/−15). Consequently, the memory AXY 60 has a size of 33×N (number of points per picture line).

If AXY(x, y, t+1) is not null, the system of FIG. 7 is never activated.

If AXY(x, y, t+1) is null, the system will be activated at a point (i, j, t+1) of the environment, if AXY(i, j, t+1) is not null.

In the case of a requested activation, the picture t and t+1 memories (70) are addressed, respectively, at (x, y, t) and (x−Px(i, j, t+1), y−Py(i, j, t), t) for the former memory and (x, y, t+1) for the latter memory.

These accesses give the data from which IND and $|I_o - I_l|$ are computed.

In the decision circuit 71, the values IND and $|I_o - I_l|$, coming from the corresponding circuits 72, 73, are processed according to the algorithm of FIG. 1.

If necessary, the module 74

$$\sqrt{Px^2(i,j,t+1) + Py^2(i,j,t+1)}$$

is called in to settle the conflicts of equality.

TABLE I

* if $|Io - I_1| < IND$
then:
Px(x, y, t + 1) = Px(i, j, t + 1)
Py(x, y, t + 1) = Py(i, j, t + 1)
IND = $|Io - I_1|$ $DR = \sqrt{Px^2(x, y, t + 1) + Py^2(x, y, t + 1)}$ AXY(x, y, t + 1) = 1
* if $|Io - I_1| = IND$

** that is $DR > \sqrt{Px^2(i,j,t+1) + Py^2(i,j,t+1)}$ then:
Px(x, y, t + 1) = Px(i, j, t + 1)
Py(x, y, t + 1) = Py(i, j, t + 1)

$DR = \sqrt{Px^2(i,j,t+1) + Py^2(i,j,t+1)}$

AXY(x, y, t + 1) = 1

** that is $DR = \sqrt{Px^2(i,j,t+1) + Py^2(i,j,t+1)}$

TABLE I-continued then:
the mean values of the following are computed:
Px(x, y, t + 1) and Px(i, j, t + 1), and:
Py(x, y, t + 1) and Py(i, j, t + 1)
which are stored in (x, y, t + 1)
and the result is validated by:
AXY(x, y, t + 1) = 1

** giving $DR < \sqrt{Px^2(i,j,t+1) + Py^2(i,j,t+1)}$ then no table is modified.
* if $|Io - I_1| > IND$ then no table is modified.

The following signals leave this decision circuit 71:
* Exchange signal 75 which modifies or does not modify IND, depending on $|Io - I_l|$, and the same for the module DR 74;
* Criterion 76 which transfers or does not transfer the vector Px(i, j, t+1), Py(i, j, t+1) towards the Px and Py memories 78 at the address (x, y). The vector validated by the selection circuit 79 corresponds to a minimum $|Io - I_l|$ criterion;
* The address (x, y) of the memory AXY is set at 1 as soon as a prediction is assigned to the point (x, y, t+1) (77).

Of course, there should be provision for the necessary management of the memory (70) addresses of pictures t and t+1, of the prediction memories Px and Py, of the memory AXY 60 (not shown). For, these different memories are read at different addresses to provide for the proper working of arrangement shown in FIG. 7.

In the first case, the address is:
x+16+int(Vx)
y+16+int(Vy)
without overlooking the picture t and t+1 memories (see FIG. 6).

For the second case, the memory AXY (60) is addressed at (x, y) and then at the surrounding points, in reading mode and then in writing mode. The Px and Py memories 78 are addressed in (x, y) and the picture t and t+1 memories 70, respectively in (x, y, t), (x−Px(i, j, t+1), y−Py(i, j, t+1), t) and (x, y, t+1).

The third and last case of conflict listed, namely the problem of the management of edges of pictures, is resolved either by using a process for spatial interpolation of the picture or, again, by using the multi-predictive system of the invention.

Description of the Multi-Predictive System

It may be recalled that the motion estimation algorithm is represented by the formula:

Estimation E = prediction P + correction function.

The correction function is a known expression, with the form: gain × DFD × spatial gradient.

The multi-predictive process consists in using, in parallel, several predictions of motion vectors, and in then choosing, as a function of the result of a test (the search for a minimum error in the picture reconstruction), the optimum prediction and, hence, the most efficient estimation.

In other words, several candidates are used for the prediction P, and their relative relevance is measured, after computing the estimation E, so as to select the best one.

The candidate predictions are of three types:
spatial predictions;
temporal predictions;
a "spatial-temporal" prediction in the axis of motion.

In practice, two patterns can be envisaged and are shown, respectively in tables 2 and 3 (set out below).

In table 2 the n predictions in parallel undergo processing by the method of WALKER and RAO in order to arrive at an estimation 1, 2, 3 . . . n, by the application of a correction function.

On the basis of each estimation, a search will be made for the source point corresponding to each point of a current picture and, after compensation, a measurement is made of the DFD (difference in luminance) between the computed point and the real point of the source picture.

A comparison is made, so to speak, in the emitter, of the result as it will be obtained in the receiver (reconstructed pictures), with the reality (namely the non-transmitted or partially transmitted source picture).

According to the invention, the best estimation of the speed vector at the point (x, y, t) is selected by determining the minimum DFD.

In another embodiment, corresponding to a multi-prediction proper (table 3) the DFD is immediately computed for each prediction. Subsequently, a choice is made of the best prediction by searching for the minimum DFD. The estimation of the speed vector at the point (x, y, t) is then computed from this single prediction by applying the correction function of WALKER and RAO.

This latter scheme, which is seemingly simpler since it computes only one correction function, has in fact proved to be less efficient than the former one for the tests made. Nevertheless, it has certain valuable aspects.

In the following description, the term "multi-prediction" refers, in fact, and in any case, to the embodiment of table 2.

Figure 8:
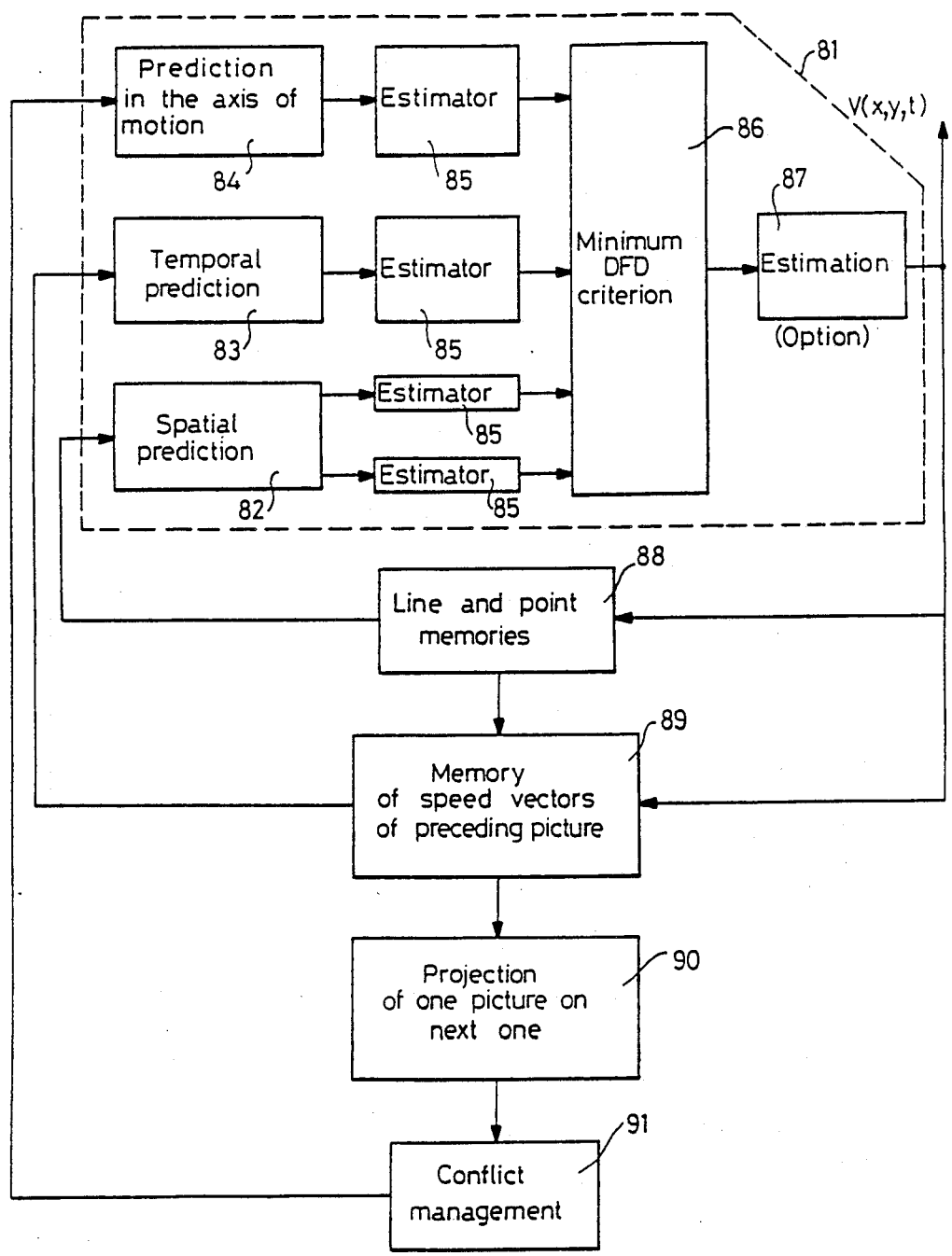
FIGS. 8 and 9 are block diagrams illustrating the implementation of a multi-predictive motion estimating method according to the invention.

The block diagram of FIG. 8 shows the mode of insertion of the multi-predictive logic circuit 81, according to the invention, in a picture encoding method.

As already stated with reference to table 2, operations are undertaken in parallel to perform one or more spatial predictions 82, one or temporal predictions 83 and one prediction 84 in the axis of the motion. These predictions are processed by estimators 85, and then the best prediction is selected at 86 by the minimum DFD criterion.

The multi-predictive estimator 81 also optionally has an additional estimation step 87. In this step, a new iteration is made by the WALKER and RAO method, by the DFD computed in 86. This additional iteration is an advantageous one, aimed at further refining the estimation of the speed vector. Furthermore, it is relatively inexpensive in terms of processing, it being known that, in the estimation equation according to WALKER and RAO, it is the computation of the DFD which requires the most complex processing. Consequently, since the DFD is available at the step 86, the complement of estimation 87, is an advantageous option.

The diagram of FIG. 8 also illustrates the use of buffer memories 88, 89, feeding the prediction steps 82, 83, 84.

The memory 88 stores the current points of the current picture and feeds the spatial prediction block 82.

The memory 89 stores the coordinates of the speed vectors of the previous picture and is connected, at output, firstly to the temporal prediction block 83 and, secondly, to the block 84 for prediction in the axis of motion, through the steps 90, 91. In the step 90, a projection is made of the speed vectors from the preceding picture to the picture, according to the method of estimation in the axis of motion described further above. The step 91 corresponds to the conflict management step already discussed.

Figure 9:
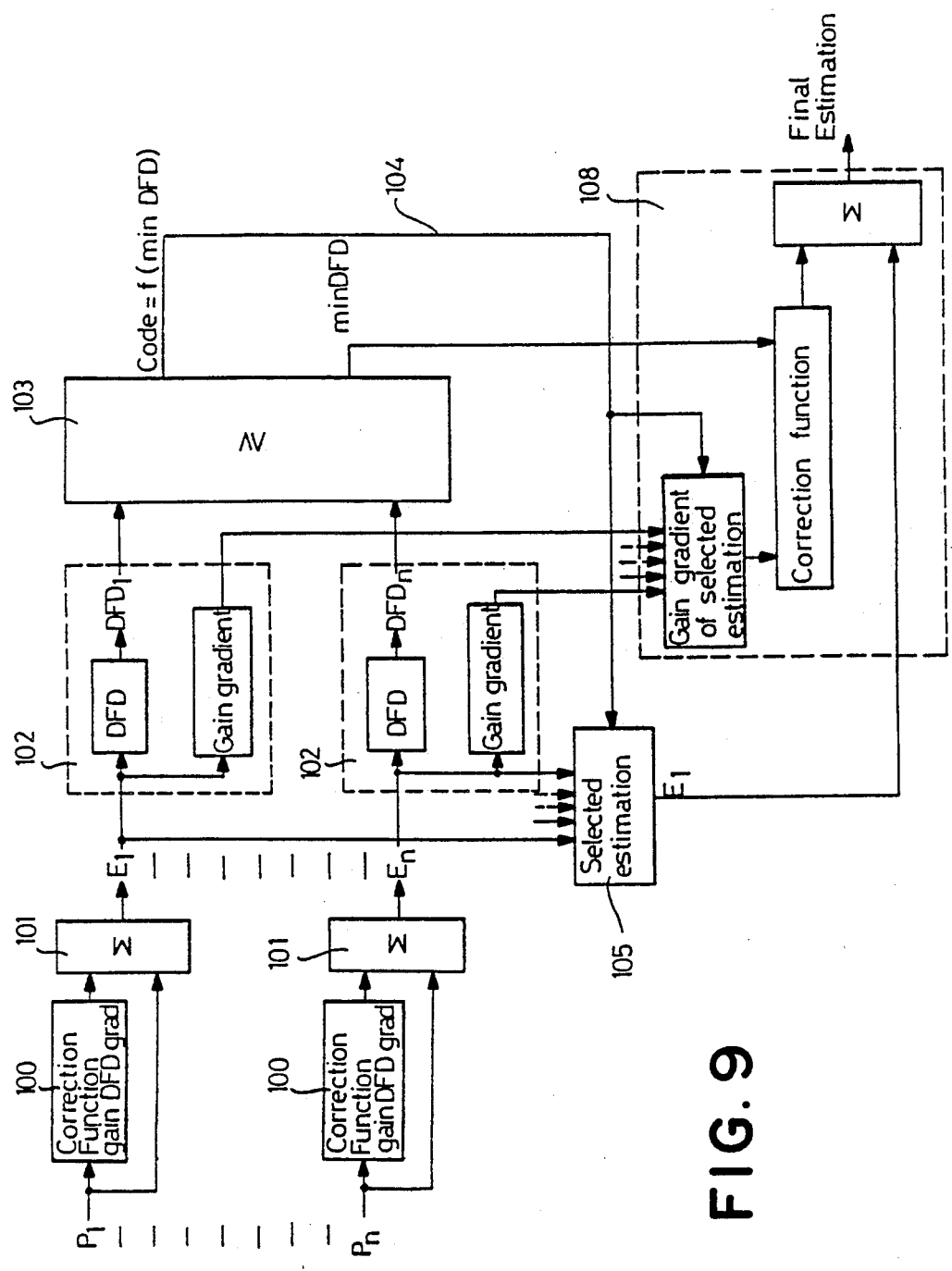

FIG. 9 gives a detailed view of a possible layout of the various circuits forming the multi-predictive motion estimation system of the invention.

The candidate predictions (x, y, t corresponds to the common point of the spatial coordinates x, y of temporal component t) are as follows:

$$P1(x, y, t) = E(x - 1, y - 1, t)$$
$$P2(x, y, t) = E(x, y - 1, t)$$
$$P3(x, y, t) = E(x, y - 1, t)$$
$$P4(x, y, t) = E(x, y, t - 1)$$
$$P5(x, y, t) = PM(x - 1, y, t)$$
$$P6(x, y, t) = PM(x + 1, y, t)$$
$$P7(x, y, t) = PM(x - 1, y + 1, t)$$
$$P8(x, y, t) = PM(x, y + 1, t)$$
$$P9(x, y, t) = PM(x + y, y + 1, t)$$
$$P10(x, y, t) = PM(x, y, t)$$
...

We note:
$P_i(x, y, t)$, a candidate prediction for the estimation $E_i$ of the point (x, y, t)
$E(k, l, m)$, the estimation previously calculated at the point (k, l, m)
$PM(n, p, t)$, the prediction in the direction of motion, assigned to the point (n, p, t)

The number of candidates may be increased in an attempt to improve the result, but the physical constraints of realisation make it necessary, on the contrary, to reduce this number. Satisfactory results have been obtained solely with the predictions P2, P5, P6, P8 and P10.

Each prediction $P_i$ determines a corrective function and their combination gives an estimation $E_i$.

To select the best estimation of the displacement vector at the point (x, y, t), the DFD corresponding to each potential estimation is computed.

The criterion of choice consists in selecting the estimation for which the DFD is minimum. In the event of conflict, the choice falls, by priority, on P10, or P8, or P6, or P5.

Each of the paths 1 to n has a circuit 100 to compute the correction function. One output of this circuit 100 is connected to an adder circuit 101, also receiving a value, at input, of the prediction $P_i$. Each adder circuit 101 gives, at output, an estimation value $E_i$ in parallel. Each estimation value $E_i$ feeds a DFD computing circuit 102, namely to compute the difference in luminance between the picture reconstructed from the estimation value $E_i$ and the real picture. Each circuit 102 also computes the gain and gradient of the estimation as meant by WALKER and RAO.

The logic of the operating system is thus as follows:
the DFD values computed in the circuits 102 are compared in the circuit 103 in order to extract the index of the prediction $P_l$ . . . $P_n$ giving the minimum DFD. This index transits through 104 up to selection circuit 105 which is fed, at input, with the values of the estimations $E_l, \ldots E_n$; and gives, at output, the selected estimation value $E_s$.

This estimation $E_s$ is then subjected to a new iteration by the method of WALKER and RAO in the circuit 108, using gain, gradient and DFD values computed in the circuits 102. The circuit 108 finally gives, at output, the final estimation of the speed vector.

Tests made have shown that, at more than 90%, the prediction in the direction of motion gives the best estimation for the speed vector.

TABLE 2

MULTI-PREDICTIVE ESTIMATION PROCESS

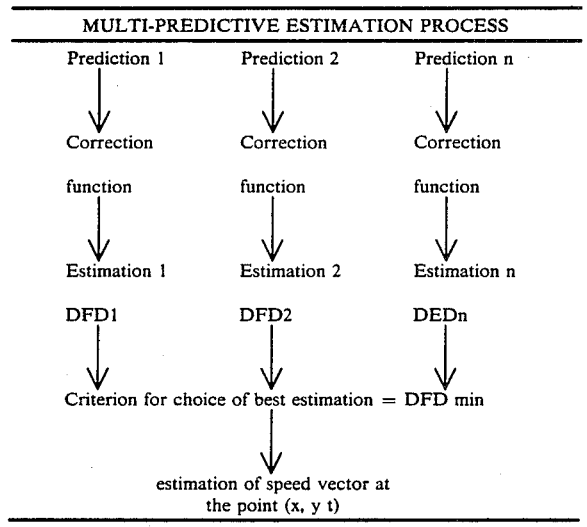

TABLE 3

MULTI-PREDICTION AS SUCH

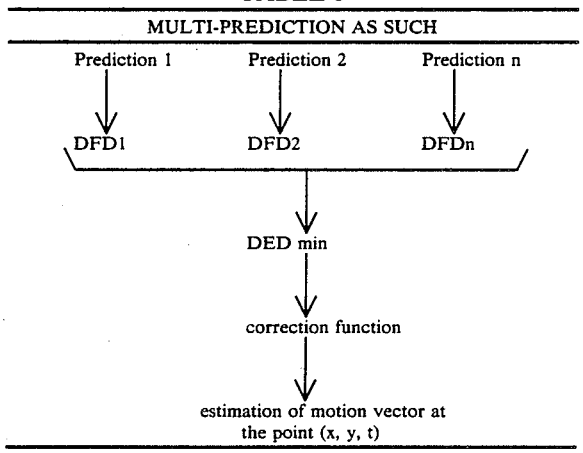

What is claimed is:

1. An image signal compaction process of motion estimation for assigning at instant t to each current point comprising a first image, a first value of a motion vector in a plane of said first image, whereby the position of each current point of said first image may be accurately approximated at an instant (t+1) in a later, second image, said compaction process comprising the steps of:
   (a) predicting said first value of said motion vector of each current point of said first image by identifying it with a second value of said motion vector associated with a corresponding, antecedent point of a third image at an earlier instant (t−1), said current point being the approximate projection of said antecedent point along said second value of said motion vector, each of said first, second and third images having a characteristic, and
   (b) correcting said predicted first value of said motion vector by optimization in accordance with the differences between said characteristics of said first and second images, said predicted first value of said motion vector being taken as a starting hypothesis for said step (b) of correcting.

2. The compaction process according to claim 1, wherein said steps of predicting and correcting are steps of a pel-recursive type process, comprising the further steps of:
   (c) predicting said first value of said motion vector of each of said current points at instant t, and
   (d) correcting said predicted first value of said motion vector by determining a most probable antecedent point of each of said current points in said first image, in an area of said predicted value, by minimizing a difference in the value of said characteristic between said current point and said most probable antecedent point.

3. The compaction process according to claim 1, wherein said step of predicting includes choosing one of the closest points to said antecedent point as said projected current point.

4. The compaction process according to claim 1, wherein said step of predicting comprises the steps of estimating a motion vector for all antecedent points of said third image, projecting said antecedent points at their current points of said first image, and said step of correcting further includes computing said second value of said motion vector of each of said current points according to said steps of predicting and correcting.

5. The compaction process according to claim 1, wherein said optimization of step (b) minimizes the difference of said characteristic between each point of said first and third images.

6. The compaction process according to claim 5, wherein said characteristic is luminance.

7. The compaction process according to claim 5, wherein said characteristic is chrominance.

8. A process for estimating the motion of a plurality of points comprising first and second images occurring sequentially at instants t and (t+1) respectively, each of said first and second images having a characteristic, said motion estimating process comprising the steps of:
   (a) providing for each of said plurality of points a motion vector;
   (b) estimating a predicted value of each motion vector from a current point of said first image to project approximately the position of a corresponding point in said second image;
   (c) predicting an initial value of said motion vector; and
   (d) correcting said initial value of said motion vector in accordance with an algorithmic prediction/correction process comprising the steps of:
      computing in parallel first and second predicted values of each motion vector using a distinct, predicted value of said current point, said predicted value being selected in accordance with at least one spatial prediction of motion, one temporal prediction of motion, or one spatial-temporal prediction in the axis of said motion vector; and
      selecting one of said first and second predicted values of said motion vector according to a decision of optimizing dependent on the difference in the values of said characteristic of said first and second images.

9. The estimating process as claimed in claim 8, further comprising the step of assigning to each of said current points having no estimated value of its motion vector, a value of said motion vector of that point, among the points close to said actual current point, which makes it possible to obtain the most accurate reconstruction with respect to said actual current point.

10. The estimating process as claimed in claim 8, wherein said characteristic is luminance.

11. The estimating process as claimed in claim 8, wherein at least one of said predated values of said motion vectors, for said current point is a prediction in the direction of the motion of a point belonging to a plurality of said points surrounding said current point in said first image.

12. A process for encoding electronic picture sequences comprising said estimating process according to said 8, said estimating process comprising the steps of encoding in parallel by at least one sampling linear filter, and comparing and selecting the best encoding process enabling the most accurate construction of said image.

13. A process for encoding electronic picture sequences comprising said estimating process according to claim 8, said estimating process comprising the steps of determining whether said points remain in their same positions in said first and second images or move by at least a given distance from said first image to said second image, and if said points have moved, encoding said moved points by the use of at least one sampling linear filter.

* * * * *